United States Patent Office

3,541,166
Patented Nov. 17, 1970

3,541,166
PRODUCTION OF VINYL FLUORIDE
AND/OR 1,1-DIFLUOROETHANE
Hiroyuki Wada, Kyoto-fu, and Yasumasa Kawakami, Osaka-fu, Japan, assignors to Daikin Kogyo Co., Ltd., Osaka-fu, Japan, a corporation of Japan
No Drawing. Filed May 21, 1968, Ser. No. 730,949
Claims priority, application Japan, May 24, 1967, 42/32,979
Int. Cl. C07c 17/08
U.S. Cl. 260—653.4    4 Claims

ABSTRACT OF THE DISCLOSURE

In the production of vinyl fluoride and/or 1,1-difluoroethane by reacting acetylene with hydrogen fluoride in the vapor phase in the presence of a solid catalyst, a method which comprises introducing feed materials, i.e. acetylene and hydrogen fluoride, with at least one of additive materials, i.e. vinyl fluoride and 1,1-difluoroethane, into the reaction zone under the conditions substantially satisfying the relationship of the following equation:

$$(R-Y+1)(F+Y+R+V+A-1) - PB(Y+V)(F+Y-2) = 0$$

wherein Y is the molar ratio of vinyl fluoride yield to feed acetylene, F is the molar ratio of feed hydrogen fluoride to feed acetylene, V is the molar ratio of additive vinyl fluoride to feed acetylene, R is the molar ratio of additive 1,1-difluoroethane to feed acetylene, P is the reaction pressure (absolute pressure), A is the molar ratio of an inert gas to feed acetylene and B is the value calculated from the following formula:

$$B = 2.79 \times 10^{-9} (1.43 \times 10^{5\frac{1}{T+273}} \times 10^3$$

in which T is the reaction temperature, F plus Y being larger than 2, to produce vinyl fluoride and/or 1,1-difluoroethane in an optional proportion.

---

The present invention relates to the production of vinyl fluoride and/or 1,1-difluoroethane.

It is known that the reaction of acetylene with hydrogen fluoride in the vapor phase in the presence of a variety of solid catalysts yields vinyl fluoride and/or 1,1-difluoroethane. It is also known that vinyl fluoride and 1,1-difluoroethane are useful respectively as the starting monomer for the production of polyvinyl fluoride and as a refrigerant or the starting compound for the preparation of vinylidene fluoride. Therefore, it is highly advantageous to be able to produce vinyl fluoride and/or 1,1-difluoroethane in an optional proportion as desired with a high conversion of acetylene in the above reaction. Although there have been proposed a number of procedures utilizing the said reaction, all these are directed to either increasing the conversion of acetylene or improving the yield of vinyl fluoride or 1,1-difluoroethane. Thus, none of the known procedures can realize the said advantageous production according to the present invention.

The object of the present invention is to provide a process for preparing vinyl fluoride and/or 1,1-difluoroethane in an optional proportion from acetylene and hydrogen fluoride with a high conversion of acetylene.

According to the present invention, the reaction between acetylene and hydrogen fluoride is carried out by introducing into the reaction zone in the presence of a catalyst these feed materials with at least one of the additive materials, i.e. vinyl fluoride and 1,1-difluoroethane, under the conditions substantially satisfying the relationship of the following equation:

$$(R-Y+1)(F+Y+R+V+A-1) - PB(Y+V)(F+Y-2) = 0 \quad (1)$$

wherein Y is the molar ratio of vinyl fluoride yield to feed acetylene, F is the molar ratio of feed hydrogen fluoride to feed acetylene, V is the molar ratio of additive vinyl fluoride to feed acetylene, R is the molar ratio of additive 1,1-difluoroethane to feed acetylene, P is the reaction pressure (absolute pressure), A is the molar ratio of an inert gas to feed acetylene and B is the value calculated from the following formula:

$$B = 2.79 \times 10^{-9} (1.43 \times 10^{5\frac{1}{T+273}} \times 10^3$$

in which T is the reaction temperature, F plus Y being larger than 2.

When vinyl fluoride or 1,1-difluoroethane is used alone as the additive, R or V is zero. Thus, the Equation 1 in such case may be written as follows:

$$V = \frac{PBY(F+Y-2) - (1-Y)(F+Y+A-1)}{1-Y-PB(F+Y-2)} \quad (2)$$

or $$R = -\frac{F+A}{2} + \sqrt{\left(\frac{F+A}{2}\right)^2 + (Y-1)(F+Y+A-1) + PBY(F+Y-2)} \quad (3)$$

wherein the symbols are each as defined above.

In determining the actual reaction conditions, Y is first determined to a desired value. Then, five factors optionally selected from F, V, R, P, A and T are appropriately determined to satisfy the said conditions. Lastly, the remaining factor is calculated according to the Equation 1 or, when R or V is zero, according to the Equation 2 or 3.

Instead of the molar ratio Y of vinyl fluoride yield to feed acetylene, the molar ratio of 1,1-difluoroethane yield to feed acetylene may be determined to a desired value. In such case, the relationship of the following equation:

$$X = 1 - Y$$

wherein X is the molar ratio of 1,1-difluoroethane yield to feed acetylene and Y is as defined above should be satisfied.

The amount of feed hydrogen fluoride should be from 1 to 4 mols per 1 mol of feed acetylene. The smaller proportion of hydrogen fluoride results in marked decrease of the conversion of acetylene, while the larger proportion will reduce the utilization of hydrogen fluoride.

The respective amount of additive vinyl fluoride and/or 1,1-difluoroethane should be in the range of 0.05 to 8 mol per 1 mol of feed acetylene. When the rate of the additive(s) exceeds the upper limit, the amount of the reaction gas to be treated increases so that the production efficiency of the reactor decreases.

The maintenance of the reaction temperature (T) at 200 to 320° C. (preferably 220 to 300° C.) is essential for carrying out the reaction practically and efficiently. When the temperature is below 200° C., the reaction rate is too small. When ti is above 320° C. the decomposition of acetylene occurs to produce undesirable byproducts such as ethylene.

The reaction pressure (P) may be from 0.5 to 4 atm., preferably about atmospheric pressure. Lower pressures render the operation difficult, whereas higher pressures cause explosion of acetylene.

The contact time may be appropriately selected depending on the reaction conditions. In the space velocity of feed acetylene (at the normal state), it may be from 1 to 1000 ml./hour per 1 g. of the catalyst.

The catalyst may be a per se conventional one insofar as having a high catalytic activity. Specific examples include aluminum fluoride, aluminum oxide and their mixtures [U.S. patent 2,471,525, French patent 1,325,750], aluminum oxide-zinc fluoride mixture [U.S. patent 2,574,480], zinc compounds treated with hydrogen fluoride in nitrogen at 65 to 200° C. [U.S. patent 2,716,142] and chromium oxides and salts [U.S. patent 2,892,000]. Of these, aluminum fluoride is the presently-preferred one.

When an inert gas such as nitrogen is incorporated into the feed materials, it serves for the prevention of superheating and control of the temperature at the reaction zone. However, such addition is not essential for the successful accomplishment of the present invention.

For carrying out the reaction, the feed materials with the additive material(s) in the vapor phase are passed into a conventional reactor where the catalyst is charged under the reaction conditions explained above. The reactor is required to be made of a material which is resistant to hydrogen fluoride at the reaction temperature employed and which does not react with acetylene to form explosive acetylide and is, for example, stainless steel, nickel or Inconel. An example of the preferred type of reactor is a vertically mounted tubular stainless steel reactor heated electrically from the outside, into which the catalyst is charged in pellet form.

In the reaction, it is noted that the amount of vinyl fluoride and/or 1,1-difluoroethane initially incorporated remains substantially unchanged. Namely, the subtraction of the amount of the vinyl fluoride originating in the feed acetylene from that of the vinyl fluoride existing in the effluent product results in a value substantially equal to the amount of the initially incorporated vinyl fluoride. The same thing is true for 1,1-difluoroethane. Therefore, a suitable amount of the vinyl fluoride and/or 1,1-difluoroethane separated from the effluent product may be recycled into the reactor for the continuous production of vinyl fluoride and/or 1,1-difluoroethane. In other words, the materials which are consumed in the reaction are only acetylene and hydrogen fluoride, and the successive provision of these feed materials in a constant ratio into the reactor makes it possible to produce continuously vinyl fluoride and/or 1,1-difluoroethane in an optional ratio as previously determined without manufacturing separately the additive materials and supplying them into the reaction system.

As will be understood from the above description, the process of this invention is advantageous in yielding continuously vinyl fluoride and/or 1,1-difluoroethane in an optional proportion with a high conversion of acetylene, compared with the known procedures.

Presently-preferred embodiments of this invention are illustratively shown in the following examples.

EXAMPLE 1

In a vertically mounted tubular stainless steel reactor (inside diameter, 27 mm.; length, 600 mm.), aluminum fluoride catalyst (120 g.) in pellet form was placed, and the reactor was heated in a molten salt bath. A mixture of acetylene, anhydrous hydrogen fluoride and vinyl fluoride was passed into the top of the reactor at almost atmospheric pressure. The effluent product from the bottom of the reactor was scrubbed with water and aqueous alkali to remove hydrogen fluoride, taken in a sampling bottle and analyzed by gas chromatography. The vinyl fluoride, 1,1-difluoroethane, hydrogen fluoride and acetylene may also be separated by distillation if desired.

The results are shown in Table 1 as well as the predetermined molar ratio Y of vinyl fluoride yield to feed acetylene and the reaction conditions. In the reaction conditions, two of the factors temperature (T), molar ratio of feed hydrogen fluoride (F) to feed acetylene and molar ratio of additive vinyl fluoride (V) to feed acetylene as underlined in the table were first selected and then the remaining factor was determined according to the said Equation 1 in which the pressure (P) was set at 1 atm.

From the table, it can be seen that the molar ratio Y of vinyl fluoride yield to feed acetylene as found is nearly equal to that previously determined.

TABLE 1

| | Predetermined molar ratio [1] | Reaction conditions | | | | | Results | | | | | Found molar ratio [1] |
|---|---|---|---|---|---|---|---|---|---|---|---|---|
| | | Molar ratio of feed materials | | | Temperature (T) (° C.) | Space velocity of $C_2H_2$ (ml./g. catalyst/hr.) | Conversion rate of $C_2H_2$ (percent) | Composition of effluent product (mol percent) | | | | |
| No. | | $C_2H_2$ | HF (F) | $CH_2=CHF$ (V) | | | | $CH_2=CHF$ | $CH_3CHF_2$ | $C_2H_2$ | $C_2H_4$ | |
| 1 | 0 | 1 | 3.94 | 0.23 | 275 | 70 | 99.8 | 18.5 | 81.2 | 0.2 | 0.1 | 0.01 |
| 2 | 0.30 | 1 | 2.30 | 1.44 | 307 | 135 | 99.8 | 70.9 | 29.0 | 0.1 | [2] | 0.29 |
| 3 | 0.10 | 1 | 2.68 | 0.46 | 286 | 122 | 99.5 | 36.6 | 63.1 | 0.3 | [2] | 0.08 |

[1] $CH_2=CHF/C_2H_2$ (Y).
[2] Trace.

EXAMPLE 2

Using the same reactor and catalyst (200 g.) as in Example 1, acetylene and hydrogen fluoride were reacted. Into the reaction zone, a mixture of acetylene, hydrogen fluoride and vinyl fluoride was introduced. The effluent product from the reactor was scrubbed with water and aqueous alkali and introduced into a condenser to separate vinyl fluoride. The separated vinyl fluoride was supplied to the reactor for continuous carrying out of the reaction.

According to the said Equation 1 in which the molar ratio Y of vinyl fluoride yield to feed acetylene was selected as zero (i.e. the yield percent of 1,1-difluoroethane being 100), the temperature (T) as 263° C. and the molar ratio of feed hydrogen fluoride (F) to feed acetylene as 2.50, the molar ratio of additive vinyl fluoride (V) to feed acetylene was determined as 0.30.

Under the above chosen reaction conditions, the reaction was continuously effected using a total of 424 g. of acetylene (calculated from the flow rate and time) at a space velocity of 75.1 ml./g. catalyst/hour for 25 hours to give 99.6% conversion of acetylene. At the stationary state, the effluent product was sampled and analyzed by gas chromatography, and the molar ratio of vinyl fluoride yield to feed acetylene was found to be 0.03. The yield of 1,1-difluoroethane was 990 g.

The feed materials contained 100 g. of vinyl fluoride initially and, with the proceeding of the reaction, the vinyl fluoride recovered from the effluent product was recycled into the reaction zone to leave finally 97 g. in the reaction system. Thus, no material increase or decrease was found in the amount of vinyl fluoride present during the reaction.

EXAMPLE 3

Using the same reactor and catalyst (120 g.) as in Example 1, acetylene and hydrogen fluoride were reacted. Into the reaction zone, a mixture of acetylene, hydrogen fluoride and 1,1-difluoroethane was introduced. The effluent product from the reactor was scrubbed with water and aqueous alkali, taken in a sampling bottle and analyzed by a gas chromatography.

The results are shown in Table 2 as well as the previously determined molar ratio Y of vinyl fluoride yield to feed acetylene and the reaction conditions. In the reaction conditions, two of the factors temperature (T), molar ratio of feed hydrogen fluoride (F) to feed acetylene and molar ratio of additive 1,1-difluoroethane (R) to feed acetylene as underlined in the table were first chosen and then the remaining factor was determined according to the said Equation 1 in which the pressure (P) was set at 1 atm.

From the table, it can be seen that the molar ratio Y of vinyl fluoride yield to feed acetylene as found is nearly equal to that previously determined.

reaction conditions, of which the molar ratio of feed hydrogen fluoride (F) to feed acetylene was determined according to the said Equation 1 by incorporating the values of the other factors therein.

TABLE 3

|  | Number 1 | Number 2 |
|---|---|---|
| Predetermined molar ratio, $CH_2=CHF/C_2H_2$ (Y) | 0.7 | 0.2 |
| Reaction conditions: | | |
| Molar ratio of feed materials: | | |
| $C_2H_2$ | 1 | 1 |
| HF (F) | 1.4 | 1.9 |
| $CH_3CHF_2$ (R) | 0.7 | 0.1 |
| $CH_2=CHF$ (V) | 0.1 | 0.8 |
| Temperature (°C.) | 250 | 250 |
| Pressure (absolute) (kg./cm.²) | 1 | 1 |
| Space velocity of $C_2H_2$ (ml./g. catalyst/hr.) | 193 | 227 |
| Results: | | |
| Conversion rate of $C_2H_2$ (percent) | 99.8 | 99.9 |
| Composition of effluent product (mol percent): | | |
| $CH_2=CHF$ | 44.2 | 52.5 |
| $CH_3CHF_2$ | 55.6 | 47.4 |
| $C_2H_2$ | 0.2 | 0.1 |
| $C_2H_4$ | (1) | (1) |
| Found molar ratio, $CH_2=CHF/C_2H_2$ (Y) | 0.696 | 0.198 |

[1] Trace.

TABLE 2

| No. | Selected molar ratio [1] | Molar ratio of feed materials $C_2H_2$ | HF (F) | $CH_3CHF_2$ (R) | Temperature (T) (°C.) | Space velocity of $C_2H_2$ (ml./g. catalyst/hr.) | Conversion rate of $C_2H_2$ percent | Composition of effluent product (mol percent) $CH_2=CHF$ | $CH_3CHF_2$ | $C_2H_2$ | $C_2H_4$ | Found molar ratio [1] |
|---|---|---|---|---|---|---|---|---|---|---|---|---|
| 1 | 0.15 | 1 | 2.80 | 0.90 | 238 | 70 | 99.8 | 8.0 | 91.9 | 0.1 | (2) | 0.152 |
| 2 | 1.00 | 1 | 1.25 | 1.22 | 264 | 153 | 99.5 | 44.8 | 55.0 | 0.2 | (2) | 0.994 |
| 3 | 0.50 | 1 | 2.00 | 0.81 | 262 | 220 | 99.8 | 28.4 | 71.5 | 0.1 | (2) | 0.514 |
| 4 | 0.50 | 1 | 2.00 | 0.32 | 280 | 220 | 99.3 | 37.1 | 62.3 | 0.5 | 0.1 | 0.495 |
| 5 | 0.10 | 1 | 2.4 | 0.81 | 220 | 23 | 99.6 | 5.7 | 94.1 | 0.2 | (2) | 0.103 |
| 6 | 0.50 | 1 | 1.60 | 0.30 | 240 | 57 | 99.7 | 33.2 | 66.4 | 0.3 | 0.1 | 0.498 |
| 7 | 1.00 | 1 | 3.88 | 3.00 | 275 | 45 | 99.6 | 25.5 | 74.2 | 0.1 | 0.2 | 1.02 |
| 8 | | 1 | 2.0 | 0 | 262 | 220 | 99.7 | 27.0 | 71.1 | 0.3 | 1.6 | 0.271 |

[1] $CH_2=CHF/C_2H_2$ (Y).
[2] Trace.

EXAMPLE 4

Using the same reactor and catalyst (130 g.) as in Example 1, acetylene and hydrogen fluoride were reacted. Into the reaction zone, a mixture of acetylene, hydrogen fluoride and 1,1-difluoroethane was introduced. The effluent product from the reactor was scrubbed with water and aqueous alkali and introduced into a condenser to separate 1,1-difluoroethane. The separated 1,1-difluoroethane was supplied to the reactor for continuous carrying out of the reaction.

According to the said Equation 1 in which the molar ratio Y of vinyl fluoride yield to feed acetylene was selected as 1.0, the temperature (T) as 270° C. and the molar ratio of feed hydrogen fluoride (F) to feed acetylene as 2.10, the molar ratio of additive 1,1-difluoroethane (R) to feed acetylene was determined as 2.22.

Under the above chosen reaction conditions, the reaction was continuously effected using a total of 282 g. of acetylene (calculated from the flow rate and time) at a space velocity of 55.3 mg./g. catalyst/hour for 20 hours to give 99.3% conversion of acetylene. At the stationary state, the effluent product was sampled and analyzed by means of gas chromatography, and the molar ratio of vinyl fluoride yield to feed acetylene was found to be 0.973. The yield of vinyl fluoride was 460 g.

The feed materials contained 350 g. of 1,1-difluoroethane initially and, with the proceeding of the reaction, the 1,1-difluoroethane recovered from the effluent product was recycled into the reaction zone to leave finally 366 g. in the reaction system. Thus, no material increase or decrease was found in the amount of 1,1-difluoroethane during the reaction.

EXAMPLE 5

Using the same reactor and catalyst (100 g.) as in Example 1, acetylene and hydrogen fluoride were reacted. Into the reaction zone, a mixture of acetylene, hydrogen fluoride, vinyl fluoride and 1,1-difluoroethane was introduced. The results are shown in Table 3 as well as the

EXAMPLE 6

Using the same reactor and catalyst (400 g.) as in Example 1, acetylene and hydrogen fluoride were reacted. Into the reaction zone, a mixture of acetylene, hydrogen fluoride, vinyl fluoride, 1,1-difluoroethane and nitrogen was introduced. The results are shown in Table 4 as well as the reaction conditions, of which the temperature (T) was determined according to the said Equation 1 by incorporating the values of the other factors therein.

TABLE 4

| | |
|---|---|
| Predetermined molar ratio $CH_2=CHF/C_2H_2$ (Y) | 0.7 |
| Reaction conditions: | |
| Molar ratio of feed materials: | |
| $C_2H_2$ | 1 |
| HF (F) | 1.4 |
| $CH_3CHF_2$ (R) | 0.7 |
| $CH_2=CHF$ (V) | 0.1 |
| $N_2$ (A) | 3.2 |
| Temperature (°C.) | 225 |
| Pressure (absolute) (kg./cm.²) | 1.6 |
| Space velocity of $C_2H_2$ (mil./g. catalyst/hr.) | 75 |
| Results: | |
| Conversion rate of $C_2H_2$ (percent) | 99.8 |
| Composition of effluent product (mol percent): | |
| $CH_2=CHF$ | 16.1 |
| $CH_3CHF_2$ | 19.8 |
| $C_2H_2$ | 0.1 |
| $C_2H_4$ | Trace |
| $N_2$ | 64 |
| Found molar ratio $CH_2=CHF/C_2H_2$ (Y) | 0.710 |

What is claimed is:

1. In the production of vinyl fluoride or 1,1-difluoroethane by reacting acetylene with hydrogen fluoride in the vapor phase in the presence of a catalyst known to catalyze such reaction, the method which comprises introducing acetylene and hydrogen fluoride with at least one of vinyl fluoride and 1,1-difluoroethane into the reaction zone of a reactor under conditions substantially satisfying the relationship of the following equation:

$$(-R-Y+1)(F+Y+R+V+A-1) -PB(Y+V)(F+Y-2)=0$$

wherein Y is the molar ratio of vinyl fluoride yield to feed acetylene, F is the molar ratio of feed hydrogen fluoride to feed acetylene in the range of 1 to 4, V is the molar ratio of additive vinyl fluoride to feed acetylene in the range of 0.05 to 8, R is the molar ratio of additive 1,1-difluoroethane to feed acetylene in the range of 0.05 to 8, P is the absolute reaction pressure, A is the molar ratio of an inert gas to feed acetylene and B is the value calculated from the following formula:

$$B = 2.79 \times 10^{-9}(1.43 \times 10^5)^{\frac{1}{T+273} \times 10^3}$$

in which T is the reaction temperature between 200 and 320° C., F plus Y being larger than 2, to produce vinyl fluoride or 1,1-difluoroethane in a predetermined proportion.

2. The method according to claim 1, wherein R is zero, the reaction being carried out under the conditions substantially satisfying the relationship of the following equation:

$$V = \frac{PBY(F+Y-2)-(1-Y)(F+Y+A-1)}{1-Y-PB(F+Y-2)}$$

wherein Y is the molar ratio of vinyl fluoride yield to feed acetylene, F is the molar ratio of feed hydrogen fluoride to feed acetylene in the range of 1 to 4, V is the molar ratio of additive vinyl fluoride to feed acetylene in the range of 0.05 to 8, P is the absolute reaction pressure, A is the molar ratio of an inert gas to feed acetylene and B is the value calculated from the following formula:

$$B = 2.79 \times 10^{-9}(1.43 \times 10^5)^{\frac{1}{T+273} \times 10^3}$$

in which T is the reaction temperature between 200 and 320° C., F plus Y being larger than 2, to produce vinyl fluoride or 1,1-difluoroethane in a predetermined proportion.

3. The method according to claim 1, wherein V is zero, the reaction being carried out under the conditions substantially satisfying the relationship of the following equation:

$$R = -\frac{F+A}{2} + \sqrt{\left(\frac{F+A}{2}\right)^2 + (Y-1)(F+Y+A-1) + PBY(F+Y-2)}$$

wherein Y is the molar ratio of vinyl fluoride yield to feed acetylene, F is the molar ratio of feed hydrogen fluoride to feed acetylene in the range of 1 to 4, R is the molar ratio of additive 1,1-difluoroethane to feed acetylene in the range of 0.05 to 8, P is the absolute reaction pressure, A is the molar ratio of an inert gas to feed acetylene and B is the value calculated from the following formula:

$$B = 2.79 \times 10^{-9}(1.43 \times 10^5)^{\frac{1}{T+273} \times 10^3}$$

in which T is the reaction temperature between 200 and 320° C., F plus Y being larger than 2, to produce vinyl fluoride or 1,1-difluoroethane in a predetermined proportion.

4. The method according to claim 1, wherein the solid catalyst is aluminum fluoride.

References Cited
UNITED STATES PATENTS 2,892,000   6/1959   Skiles _____ 260—653.4

DANIEL D. HORWITZ, Primary Examiner

U.S. Cl. X.R.

260—653.6